(12) United States Patent
Florez

(10) Patent No.: US 10,327,497 B1
(45) Date of Patent: Jun. 25, 2019

(54) HELMET-MOUNTED RADIO ASSEMBLY WITH EXTENDED CONTROLS

(71) Applicant: Otoniel Florez, Plantation, FL (US)

(72) Inventor: Otoniel Florez, Plantation, FL (US)

( * ) Notice: Subject to any disclaimer, the term of this patent is extended or adjusted under 35 U.S.C. 154(b) by 0 days.

(21) Appl. No.: 15/974,853

(22) Filed: May 9, 2018

(51) Int. Cl.
*H04M 1/00* (2006.01)
*A42B 3/30* (2006.01)
*H04B 1/3827* (2015.01)

(52) U.S. Cl.
CPC ............... *A42B 3/30* (2013.01); *H04B 1/385* (2013.01); *H04B 2001/3855* (2013.01); *H04B 2001/3866* (2013.01)

(58) Field of Classification Search
CPC .. A42B 3/30; H04B 1/385; H04B 2001/3866; H04B 2001/3855
See application file for complete search history.

(56) References Cited

U.S. PATENT DOCUMENTS

| | | | | |
|---|---|---|---|---|
| 4,297,747 A | * | 11/1981 | Nava | A42B 3/224 |
| | | | | 2/424 |
| 4,607,395 A | * | 8/1986 | Sundahl | A42B 3/30 |
| | | | | 338/163 |
| 6,101,256 A | * | 8/2000 | Steelman | H04R 5/023 |
| | | | | 381/122 |
| 2017/0150769 A1 | * | 6/2017 | Lebel | A42B 3/30 |
| 2017/0188648 A1 | * | 7/2017 | Larrabee | A42B 3/28 |
| 2018/0289095 A1 | * | 10/2018 | Catterson | A42B 3/303 |

FOREIGN PATENT DOCUMENTS

WO      02/087282      * 10/2002

* cited by examiner

*Primary Examiner* — Barry W Taylor
(74) *Attorney, Agent, or Firm* — Sanchelima & Associates, P.A.; Christian Sanchelima; Jesus Sanchelima

(57) ABSTRACT

The present invention is a helmet-mounted radio assembly with extended controls. In the helmet-mounted radio assembly, a radio device is removably mounted on a helmet. The radio device includes extensions connected to the microchips for controlling various functions thereof. The extensions extend outside of a body of the radio device, and control dials are provided at distal end of the extensions. Thus, a user can have extended controls ergonomically located within easy reach thereof for controlling the regular functions, like volume control, changing channel frequency, or switching on/off the radio device. The helmet-mounted radio assembly utilizes reliable mounting arrangement, such as use of band and clips, screws or other suitable mounting member for removably mounting the radio device to the helmet.

7 Claims, 4 Drawing Sheets

HELMET-MOUNTED RADIO ASSEMBLY WITH EXTENDED CONTROLS

BACKGROUND OF THE INVENTION

1. Field of the Invention

The present disclosure generally relates to a two-way radio device for communication, and more particularly to a two-way radio device adapted to be removably mounted to a helmet and having extended controls for convenient use of a user.

2. Description of the Related Art

Many jobs require constant communication among the workers on worksite. Sometimes, these jobs may need to be performed in noisy and dangerous environments. For example, mine workers need to work at different locations of a mine site in harsh conditions amid constant background noise. Similarly, construction workers need to work at different locations of a work site under noise of construction equipment. In such work environments, it may not be possible for co-workers to directly communicate, at a distance, instructions to each other. That said, effective and reliable communication among co-workers in such environments is very important for safe operations.

Traditionally, electronic devices like two-way radios have been used for communication between workers in such situations. It is to note that these types of work environments demand physical activity which may require involvement of both hands of the workers. Thus, a worker may not be left with any spare hand to handle and manipulate the standalone radio device effectively. Moreover, the worker is usually required to wear large and bulky gloves in such environments. Therefore, it would be cumbersome for the worker to be able to properly manipulate the radio device (i.e. operate the various buttons on the radio device), especially because the buttons on the radio device are typically small in size.

Some solutions have been provided in the art to this problem. Since, these kind of work environments usually require the worker to wear hear-gear, like hard helmets for safety purposes; some equipment manufacturers have fitted the radio devices on the helmet itself. Usually, an earpiece or the like extend from the radio mounted on the helmet to be inserted by the worker into his/her ear for listening to the communication on the selected channel, and further speak into the microphone thereof.

Applicant believes that a related reference corresponds to WIPO Publication Number 2002087282A1 (hereinafter, the '282 publication) which discloses a communications system attached to a helmet using a resilient clip adapted to use spring forces to elastically and removably grasp the lower peripheral rim of the helmet. Rigidly fixed to the resilient clip is a junction box. A microphone and speakers are attached to the helmet and are electrically connected to a transceiver through the junction box. However, the '282 publication still does not provide any convenient means for controlling the communication system attached to the helmet therein.

The known solutions in the prior-art still suffers from the problem of providing some convenient means for manipulating the radio device, such as changing the channel frequency, or controlling the volume of the radio device. Due to the radio device being mounted on top of the helmet, the worker would have to fiddle around to guess the exact location of the controls on the radio device; and sometimes may even accidently manipulate some wrong control button/dial which could possibly lead to communication blackout and be potentially dangerous to the safety of the worker.

Other documents describing the closest subject matter provide for a number of more or less complicated features that fail to solve the problem in an efficient and economical way. None of these patents suggest the novel features of the present invention.

SUMMARY OF THE INVENTION

It is one of the main objectives of the present invention to provide a helmet-mounted radio assembly having a radio device removably mounted on a helmet.

It is another objective of the present invention to provide a helmet-mounted radio assembly with reliable means for mounting of the radio device to the helmet.

It is yet another objective of the present invention to provide a helmet-mounted radio assembly with the radio device having extended controls for ergonomic use.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
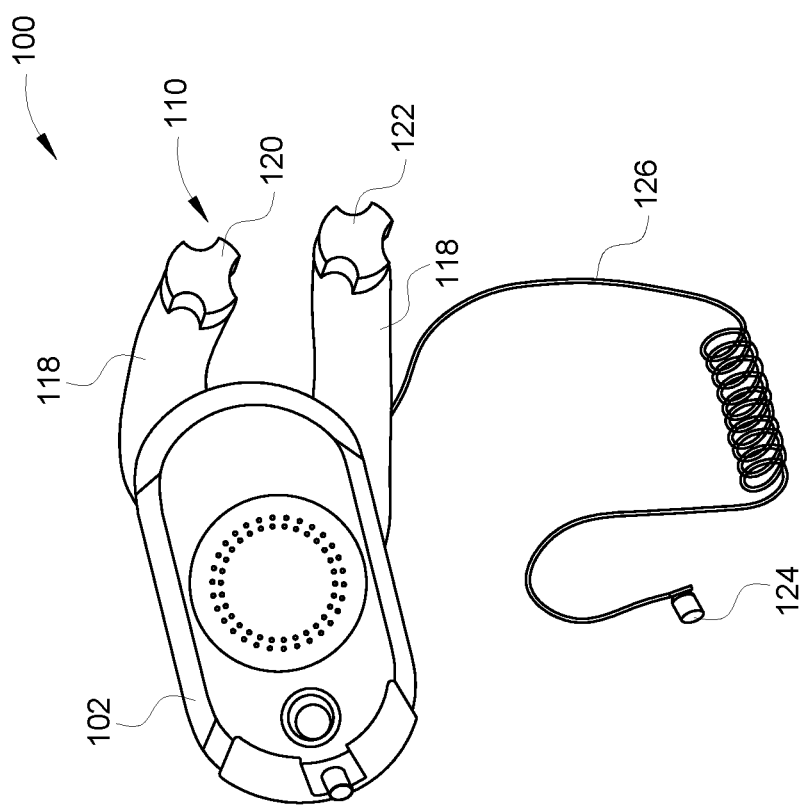
FIG. 1 illustrates a diagrammatic view of a radio device 100 with extended controls 110, in accordance with one or more embodiments of the present disclosure.

Referring now to the drawings, FIG. 1 illustrates a diagrammatic view of a radio device 100, in accordance with one or more embodiments of the present disclosure. The radio device 100 may be any short range wireless communication device which can be used for simple yet effective communication between people, such as co-workers in a worksite. The radio device 100 has the advantage that it is not reliant on transmission towers to be in the area, and thus can be used as a reliable means for communication in remote and difficult work environments, such as a mining facility, construction site, etc. The radio device 100 is generally in the form of a "control box" with means for controlling communication, and the two terms have been interchangeably used hereinafter without any limitations.

Figure 2:
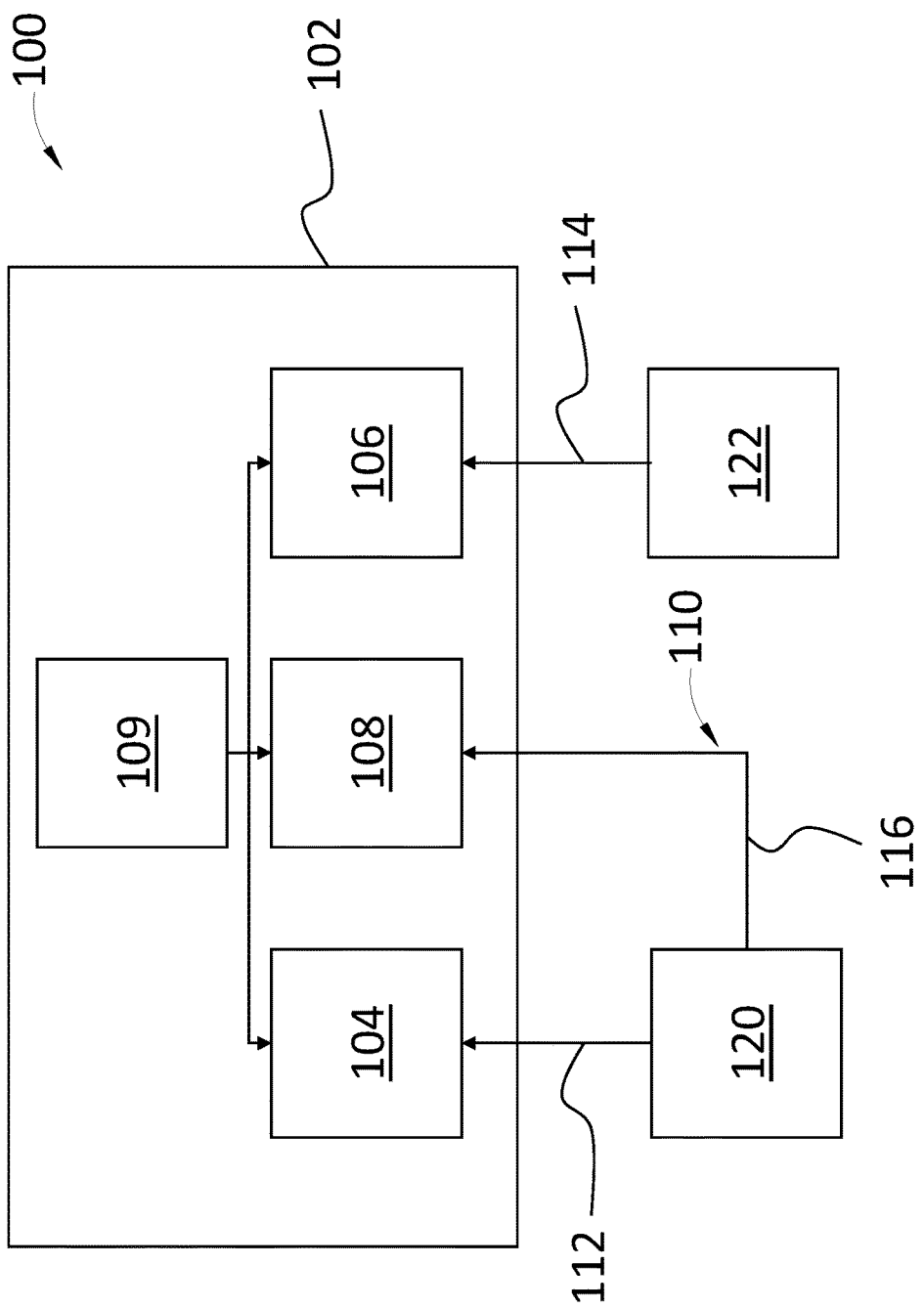
FIG. 2 illustrates a schematic block diagram of the radio device 100 with extended controls 110, in accordance with one or more embodiments of the present disclosure.
Figure 3:
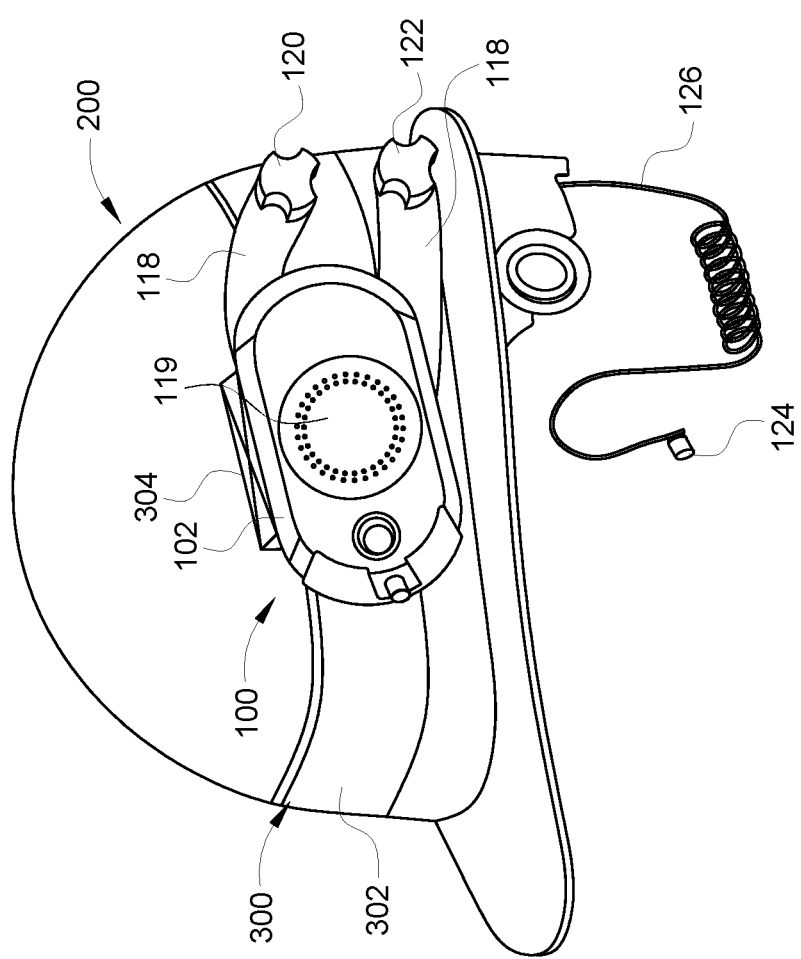
FIG. 3 illustrates a diagrammatic view of a helmet-mounted radio assembly 200 with mounting arrangement 300, in accordance with one embodiment of the present disclosure.

The radio device 100 includes a body 102 to house various components therein, such as conventional speaker elements (not illustrated) and circuitry. FIG. 2 illustrates a schematic block diagram of the radio device 100 of the present disclosure. As schematically illustrated, the radio device 100 includes multiple circuits to control various functions thereof. For example, the radio device 100 includes a volume microchip 104 configured to control output volume of the radio device 100, as per instructions from the user. The radio device 100 also includes a channel microchip 106 configured to select the connecting channel frequency of the radio device 100, as per instructions from the user. Further, the radio device 100 includes an on/off microchip 108 configured to switch ON and OFF the radio device 100, as per instructions from the user. In the radio device 100, the volume microchip 104, the channel microchip 106 and the on/off microchip 108 are generally located inside the body 102 of the radio device 100. The radio device 100 may further include a battery 109 for powering the various components thereof. FIG. 3 shows pushbutton 119 known in the art to turn on a microphone. Pushbutton 119 is pressed prior to a user speaking into headphone/microphone combination 124 or a stand alone microphone.

It may be understood that a traditional radio device includes different types of controls associated with its multiple microchips for controlling various functions thereof. These controls are typically provided on an outer surface of a body of the traditional radio device. Referring to FIGS. 1 and 2 in combination, the radio device 100 includes extended controls 110 for controlling various functions thereof, in accordance with one or more embodiments of the present disclosure. The said extended controls 110 are located outside of the body 102 of the radio device 100. For this purpose, the radio device 100 includes at least one extension member. In the present embodiments, as illustrated in FIG. 2, the radio device 100 includes multiple extension members, namely a first extension 112 electrically connected to the volume microchip 104 and the second extension 114 electrically connected to the channel microchip 106. Further, the radio device 100 may include a third extension 116 which may be connected to the on/off microchip 108.

In an embodiment, the extensions 112, 114 and 116 include signal conducting wires extending from inside of the body 102 of the radio device 100. In particular, these extensions 112, 114 and 116 are respectively connected to the volume microchip 104, the channel microchip 106 and the on/off microchip 108 inside the body 102. In some examples, the extensions 112, 114 and 116 may be in the form of computer bus cables which are adapted to be utilized for transferring data as well as voltage signals. As may be contemplated from FIG. 1, the extensions 112, 114 and 116 are covered in sheath layers 118 in order to be protected from physical damage as well as electronic interference. In an embodiment, the third extension 116 may be paired with either one of the first extension 112 or the second extension 114 inside the corresponding sheath layer 118. In the illustrated example of FIG. 2, the third extension 116 has been shown to be paired with the first extension 112, in the radio device 100.

In an embodiment, the extended controls 110 include controls connected to the distal end of the extensions for sending instructions to the correspondingly connected microchip therewith. For example, the first extension 112 has a volume dial 120 electrically connected at the distal end thereof, and the second extension 114 has a channel dial 122 electrically connected at the distal end thereof. Further, the third extension 116 may also be electrically connected to the volume dial 120 at the distal end thereof. It may be understood that the volume dial 120, connected to the volume microchip 104, can be used to regulate the output volume of the radio device 100. That is, a user by turning the volume dial 120 in one direction, say clockwise direction, can increase the output volume of the radio device 100; and by turning the volume dial 120 in opposite direction, i.e. the anti-clockwise direction, can decrease the output volume of the radio device 100. Similarly, the channel dial 122, connected to the channel microchip 106, can be used to regulate the connecting channel frequency of the radio device 100. That is, a user by turning the channel dial 122 in one direction, say clockwise direction, can increase the connecting channel frequency of the radio device 100; and by turning the channel dial 122 in opposite direction, i.e. the anti-clockwise direction, can decrease the connecting channel frequency of the radio device 100. In an embodiment, the volume dial 120 may also be used for switching ON and OFF the radio device 100. For this purpose, when the volume dial 120 is turned all the way back in one direction, say the anti-clockwise direction, to its initial position, the volume dial 120 sends a signal to the on/off microchip 108 via the third extension 116 to switch OFF the radio device 100; and when the volume dial 120 is turned a bit in opposite direction, i.e. the clockwise direction, the volume dial 120 sends a signal to the on/off microchip 108 via the third extension 116 to switch ON the radio device 100. It may be contemplated that alternatively the third extension 116 may be connected to the channel dial 122; and, in such case, the channel dial 122 may be utilized for the purpose of switching ON and OFF the radio device 100.

In addition, the radio device 100 may optionally be connected with a headphone/microphone 124 for listening to the communication from the radio device 100. As illustrated in FIG. 1, the headphone/microphone 124 is extending outwardly of the body 102 by means of a wire 126. The wire 126 has been shown to be a coiled wire; however, in other examples, the wire 126 may be a non-coiled wire without any limitations. As may be contemplated by a person skilled in the art, the headphone/microphone 124 may be inserted by the user in his/her ear to listen to the communication from the radio device 100.

Figure 4:
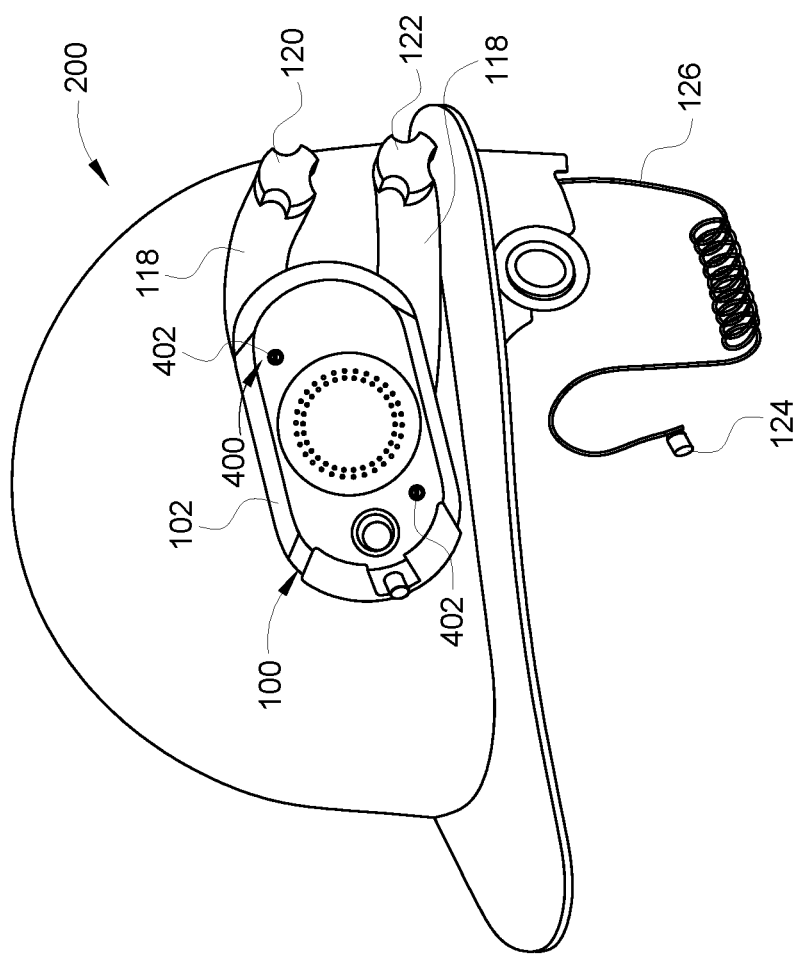
FIG. 4 illustrates a diagrammatic view of a helmet-mounted radio assembly 200 with mounting arrangement 400, in accordance with another embodiment of the present disclosure.

Referring now to FIGS. 3 and 4, a helmet-mounted radio assembly 200 is shown, in accordance with an embodiment of the present disclosure. The helmet-mounted radio assembly 200 includes a helmet 202 to which the radio device 100 is mounted. For mounting the radio device 100 to the helmet 202, the helmet-mounted radio assembly 200 includes mounting members. In one embodiment, as illustrated in FIG. 3, the helmet-mounted radio assembly 200 includes a mounting arrangement 300 having a band 302 wrapped around and supported on the outer surface of the helmet 202. Further, the mounting arrangement 300 includes a clip 304 attached to a back side of the body 102 of the radio device 100. As may be contemplated, the clip 304 can be used to engage with the band 302 for mounting the radio device 100 to the helmet 200, in the helmet-mounted radio assembly 200. In another embodiment, as illustrated in FIG. 4, the helmet-mounted radio assembly 200 may utilize a mounting arrangement 400 using screws 402 as mounting member for mounting the radio device 100 to the helmet 202. In yet another embodiment, the helmet-mounted radio assembly 200 may include a carriage (not shown) fixed or adhered to the helmet 202, and the carriage in turn may support the radio device 100 therein. In some embodiments, the helmet-mounted radio assembly 200 may include one or more solar panels (not shown) fixed to the outer surface of the helmet 200 to generate electric power and electrically connected to the battery 109 of the radio device 100. The generated power could charge the battery 109 to in turn be used for powering the radio device 100.

Conventional radio device includes volume controls and channel controls provided on the body thereof. Such controls are, typically, in the form of small buttons or dials which may not be easily accessible by a user wearing gloves or the like, especially when the radio device is mounted on a helmet and not in direct sight of the user. Thus, the user may have to fiddle around to find the right button or dial which is cumbersome. With the extended controls 110 in the radio device 100 of the present disclosure, the user can easily locate the right control dials for controlling the desired function of the radio device 100. Further, given the expected use of the radio device 10 in outdoor environments, the sheath layers 118 provides waterproof and dustproof arrangement for the extended controls 110. It may be understood that the radio device 100 may be arranged in any manner in the helmet-mounted radio assembly 200 in order for the dials 120 and 122 to be within easy approach of the user. For instance, the radio device 100 may be oriented such that the extended controls 110 may be hanging in downward direction for the dials 120 and 122 to be in relative proximity to the user. With the helmet-mounted radio assembly 200 of the present disclosure, the radio device 100 doesn't interfere with work to be performed by the user. The radio device 100 may be completely unobtrusive in that it may be positioned inside or on the helmet 202 or other headgear of the user.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A helmet, comprising:
   a two-way radio mounted thereon having a circumference, two extensions extending away from said two-way radio, each extension having a knob at its distal end, a first knob connected to a channel microchip, a second knob connected to an on and off microchip, said second knob also connected to a volume microchip, a battery used to power said first, second and third microchips; said first and second knobs are located entirely outside said circumference.

2. The helmet of claim 1 wherein said two-way radio is rotatably mounted to a third extension having a distal end, a third knob at said distal end, said third knob connected to said volume or on and off microchip.

3. The helmet of claim 1 wherein said two-way radio includes sheath layers adapted to protect said body from physical damage and electronic interference.

4. The helmet of claim 1 wherein a microphone and headphone combination unit is mounted to said two-way radio using a wire.

5. The helmet of claim 1 wherein, a pushbutton is located on said two-way radio and is adapted to turn on said microphone.

6. The helmet of claim 1 having a band that extends around said helmet, said band used to mount said two-way to said helmet.

7. The helmet of claim 1 wherein said helmet includes a front end and a rear end, said two extensions both extend towards said rear end.

* * * * *